(12) United States Patent
Rosenberg

(10) Patent No.: US 6,764,029 B2
(45) Date of Patent: Jul. 20, 2004

(54) WATER IRRIGATION SYSTEM AND METHOD, AND CONTROL UNIT USEFUL THEREIN

(76) Inventor: Peretz Rosenberg, Moshav Beit Shearim, Doar Na Ha'amakim (IL)

( * ) Notice: Subject to any disclaimer, the term of this patent is extended or adjusted under 35 U.S.C. 154(b) by 65 days.

(21) Appl. No.: 10/212,152

(22) Filed: Aug. 6, 2002

(65) Prior Publication Data

US 2003/0029929 A1 Feb. 13, 2003

(30) Foreign Application Priority Data

Aug. 7, 2001 (IL) ................................. 144784
Dec. 24, 2001 (IL) ................................. 147275

(51) Int. Cl.$^7$ ........................... B05B 15/00; B05B 1/08; A01G 27/00
(52) U.S. Cl. ........................ 239/542; 239/145; 239/99
(58) Field of Search ..................... 239/99, 542, 145, 239/547, 93; 47/48.5

(56) References Cited

U.S. PATENT DOCUMENTS

| | | | | |
|---|---|---|---|---|
| 4,191,330 A | * | 3/1980 | Sample | ...................... 239/66 |
| 4,781,217 A | * | 11/1988 | Rosenberg | ............. 137/624.14 |
| 5,249,745 A | * | 10/1993 | Bertolotti | ...................... 239/76 |
| 5,314,116 A | * | 5/1994 | Krauth et al. | .................. 239/99 |
| 5,353,993 A | * | 10/1994 | Rosenberg | ................... 239/542 |
| 5,507,436 A | * | 4/1996 | Ruttenberg | ...................... 239/1 |
| 5,727,733 A | * | 3/1998 | Ruttenberg | ..................... 239/99 |
| 5,779,163 A | * | 7/1998 | Gunter | ....................... 239/734 |
| 6,026,851 A | * | 2/2000 | Rosenberg | ................... 137/508 |
| 6,186,423 B1 | * | 2/2001 | Chapman | .................... 239/729 |
| 2002/0030066 A1 | * | 3/2002 | McKenna | .................... 222/325 |

* cited by examiner

Primary Examiner—William C. Doerrler
(74) Attorney, Agent, or Firm—Benjamin J. Barish

(57) ABSTRACT

A water irrigation system includes a dripper tube having a plurality of water discharge openings along its length for discharging water at a slow rate from each opening; and a pulsator device connecting a water supply conduit to the dripper tube and producing a pulsatile water flow to the dripper tube having a frequency substantially exceeding one cycle per second (CPS). In a described preferred embodiment, the pulsator device is connected to the dripper tube by a connecting tube of a length and cross-sectional area such as to produce a resonant feedback system with the pulsator device producing a pulsatile water flow to the dripper tube having a frequency exceeding 10 CPS.

27 Claims, 10 Drawing Sheets

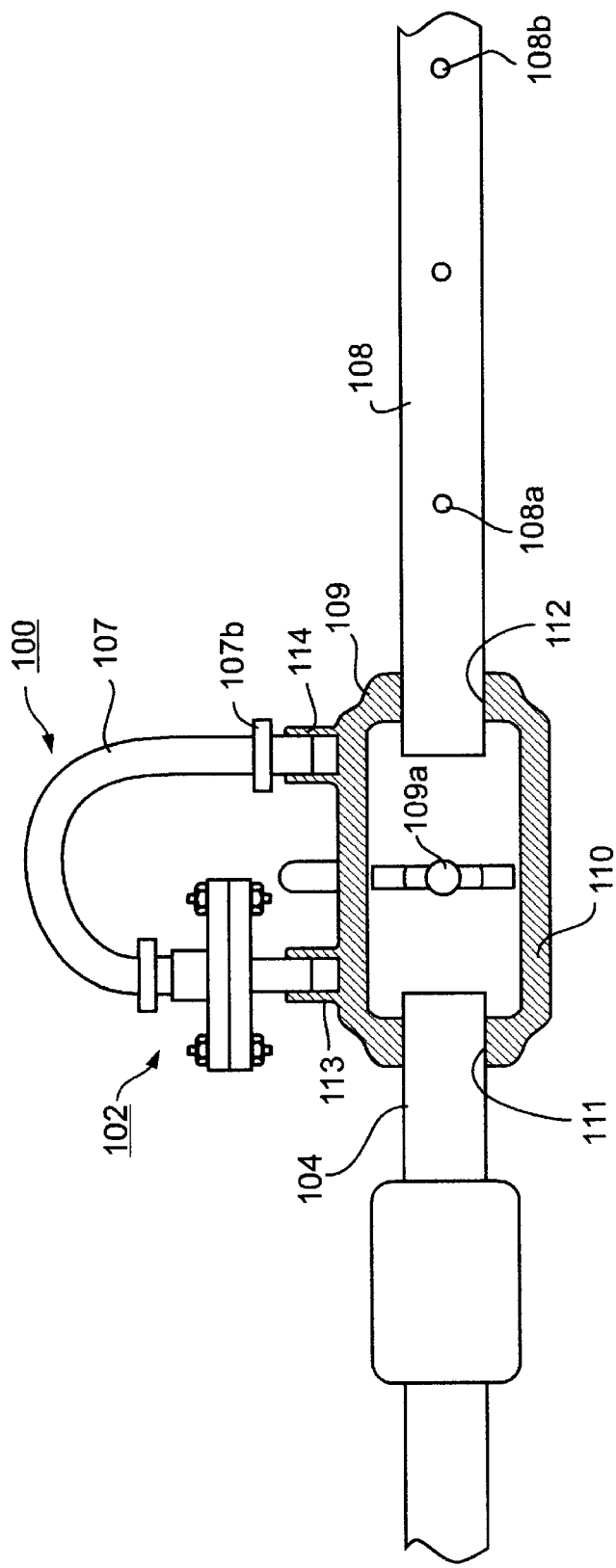

WATER IRRIGATION SYSTEM AND METHOD, AND CONTROL UNIT USEFUL THEREIN

FIELD AND BACKGROUND OF THE INVENTION

The present invention relates to a drip irrigation system and also to a method of drip irrigation. The invention also relates to a control unit particularly useful in the drip irrigation system and method.

Drip irrigation is now widely used in water irrigation systems, wherein a water supply conduit is connected to a plurality of dripper tubes each provided with a plurality of emitter openings along its length for discharging water at a slow rate from each opening. Such dripper tubes are thus capable of supplying water directly to the region of the plants at a very slow rate, thereby saving water and frequently also increasing yields.

At the present time, such dripper tubes are operated at flow rates of at least one or two liters per hour at each emitter opening. If the dripper tubes are operated at lower flow rates in the existing systems, there would be little if any discharge from the emitter openings at the ends of the dripper tubes particularly in long lines and/or in irregular land topography. Drip irrigation systems also commonly use pressure-compensated emitters for purposes of equalizing as much as possible the discharge rates of the emitters along the length of the tube irrespective of the length of the tube and/or the topography on which the dripper tube is used. However, even in pressure-compensated drippers, there is still a minimum discharge rate, of the order of one or two liters per hour, which must be provided if the dripper tube is to operate satisfactorily along its complete length.

OBJECTS AND BRIEF SUMMARY OF THE INVENTION

An object of the present invention is to provide a water irrigation system which enables dripper tubes to be operated at substantially lower discharge rates than heretofore possible and still provide satisfactory performance of the dripper tube along its complete length. Another object of the invention is to provide a method of irrigation using dripper tubes of various constructions, including those presently used as well as those that may be used in the future, but which permit the dripper tubes to be satisfactorily operated at substantially lower discharge rates than heretofore possible for the complete length of the dripper tube. A further object of the invention is to provide a novel control unit which may be introduced into existing drip irrigation systems to provide the foregoing advantages.

According to one aspect of the present invention, there is provided a water irrigation system, comprising: a water supply conduit; a dripper tube having a plurality of water discharge openings along its length for discharging water at a slow rate from each opening; and a pulsator device connecting the the water supply conduit to the dripper tube and producing a pulsatile water flow to the dripper tube having a frequency substantially exceeding one cycle per second (CPS).

Preferably, the pulsator device produces a pulsatile water flow to the dripper tube having a frequency exceeding 10 CPS. Particularly good results are obtainable when the pulsator device is connected to the dripper tube by a connecting tube of a length and cross-sectional area such as to produce a resonant feedback system with the pulsator device producing a pulsatile water flow to the dripper tube having a frequency exceeding 10 CPS.

I have found that a water irrigation system constructed in accordance with the foregoing features enables dripper tubes designed to produce a discharge rate of about one or two liters per hours per emitter opening, may be operated in accordance with the present invention to output the water at a fraction of that rate, e.g., at about 0.2–0.5 liters per hour, and still enable all the emitter units along the length of the dripper tube to output the water at this extremely low rate. While the particular mechanism of action involved in this result is not known with certainty, it is believed that the pulsator device, particularly when used with the connecting tube as described above, produces, by resonance feedback, a pulsatile flow of such a high frequency and intensity as to more effectively distribute or "pump" the water along the complete length of the dripper tube even during low-flow conditions. Such high-frequency pulsations are believed to overcome the resistance of the water flow even with such low flow rates as would, in conventional dripper tube systems, fail to produce water discharge at the far ends of the dripper tubes.

The expression "pulsatile water flow" is used herein in its broadest sense, to include not only an interrupted water flow, wherein the pulsations are distinct pulses separated by interruptions in the water flow (as in a conventional pulsator system), but also a continuous water flow wherein the pulsations are modulations or ripples in the continuous water flow. Actually, the latter would be the preferred case in most applications of the invention wherein a resonant feedback is utilized to produce the high frequency pulsations exceeding 10 CPS.

Such a system is capable of producing very sizeable water savings without sacrificing crop yields. In some cases, the crop yields may be even increased despite the relatively small amount of water used.

In addition, an additional water supply may be coupled to an inlet to the dripper tube just downstream of the control valve, thereby permitting pressurized water in the water supply conduit to actuate the pulsatile device to act as a pump for pumping the water inletted to the dripper tube from the additional water supply. The additional water supply may be, for example, a water container collecting waste water from other sources, such as from air conditioning systems, collected rainwater, etc.

According to another aspect of the present invention, there is provided a water irrigation system, comprising: a water supply conduit; a dripper tube provided with a plurality of emitter openings along its length for discharging water at a slow rate from each emitter opening; a control valve connecting the water supply conduit to the dripper tube; and a pulsator device connecting the water supply conduit from a point upstream of the control valve to the dripper tube at a point downstream of the control valve; the control valve having an open position to produce a continuous water flow from the water supply conduit to the dripper tube to fill the dripper tube; and a closed position to produce a pulsatile water flow from the water supply conduit to the dripper tube via the pulsator device.

According to a further aspect of the present invention, there is provided a control unit for use in a drip irrigation system having a water supply conduit and a dripper tube provided with a plurality of emitter openings along its length for discharging water at a slow rate from each emitter opening; the control unit comprising: a housing having an inlet end connectable to the water supply conduit, and an outlet end connectable to the dripper tube; a valve member within the housing movable from an open position for permitting water flow from the inlet to the outlet, and to a closed position for blocking water flow from the inlet to the outlet; a pulsator device having an inlet connected to the housing between its inlet and the valve member; and a connecting tube connected between the outlet of the pulsator device and the housing between its outlet and the valve member.

Such a control unit could thus be connected into an existing drip irrigation system, between the water supply conduit and each dripper tube, to enable such a system to be operated at much lower discharge rates than their original design rates, or those considered to be heretofore possible in existing drip irrigation systems, to provide substantial water savings as well as possible increases in crop yields.

According to yet another aspect of the present invention, there is provided a method of irrigation, comprising: supplying water from a water supply conduit to a dripper tube provided with a plurality of emitter openings along the length of the dripper tube; and feeding the water from the water supply conduit to the dripper tube via a pulsator device which produces a pulsatile water flow to the dripper tube at a frequency substantially exceeding 1 CPS. Preferably, in accordance with the described preferred embodiments, the pulsator device is connected to the dripper tube by a connecting tube of a length and cross-sectional area such as to produce a resonant feedback system with the pulsator device producing a pulsatile water flow to the dripper tube having a frequency exceeding 10 CPS.

According to a still further aspect of the invention, there is provided a method of irrigation, comprising: supplying water from a water supply conduit to a dripper tube provided with a plurality of emitter openings along the length of the dripper tube; initially feeding the water from the water supply conduit to the dripper tube at a high rate to at least partially fill the dripper tube with water and to start to produce discharges of water from the emitter openings at a relatively low rate from each emitter opening; and thereafter feeding the water from the water supply conduit to the dripper tube at a low rate via a pulsator which produces a high-frequency pulsatile water flow within the dripper tube effectively moving the water along the length of the dripper tube to the emitter openings. For example, and as indicated earlier, the pressurized water supply conduit could be used as a source of pressure for causing the pulsatile device to act as a pump for pumping water collected from other sources, such as from air conditioning systems, rainfall, etc., thereby enabling a further savings of water to be effected.

Further features and advantages of the invention will be apparent from the description below.

BRIEF DESCRIPTION OF THE DRAWINGS

The invention is herein described, by way of example only, with reference to the accompanying drawings, wherein:

FIG. 8 illustrates the drip irrigation system of FIG. 1 implemented in a control unit which may be conveniently connected into an existing drip irrigation line to enable the discharge rates to be substantially decreased to a fraction of the discharge rates permitted by the existing drip irrigation systems;

DESCRIPTION OF PREFERRED EMBODIMENTS

As will be described more particularly below, the present invention includes a pulsator device connecting a water supply conduit to a dripper tube. Best results have been obtained when the pulsator device is of the construction described in my prior U.S. Pat. No. 6,026,851 (corresponding to Israel Application No. 121,380), and therefore the invention is described below particularly with respect to that pulsator device.

Figure 1:
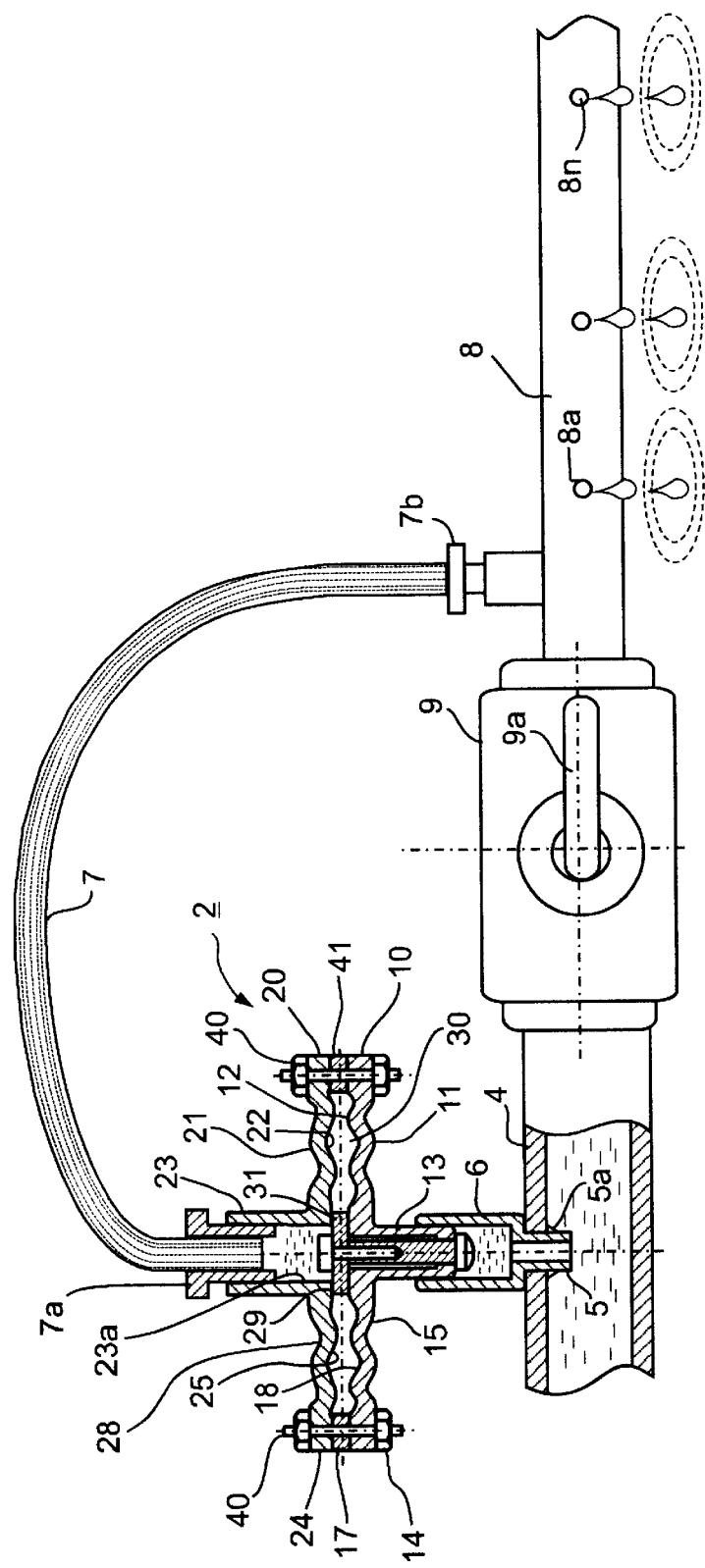
FIG. 1 illustrates one form of drip irrigation system, partly in section, constructed in accordance with the present invention, in which the control valve in the illustrated system is open to produce relatively large water drops at the emitter outlets of the dripper tube.
Figure 2:
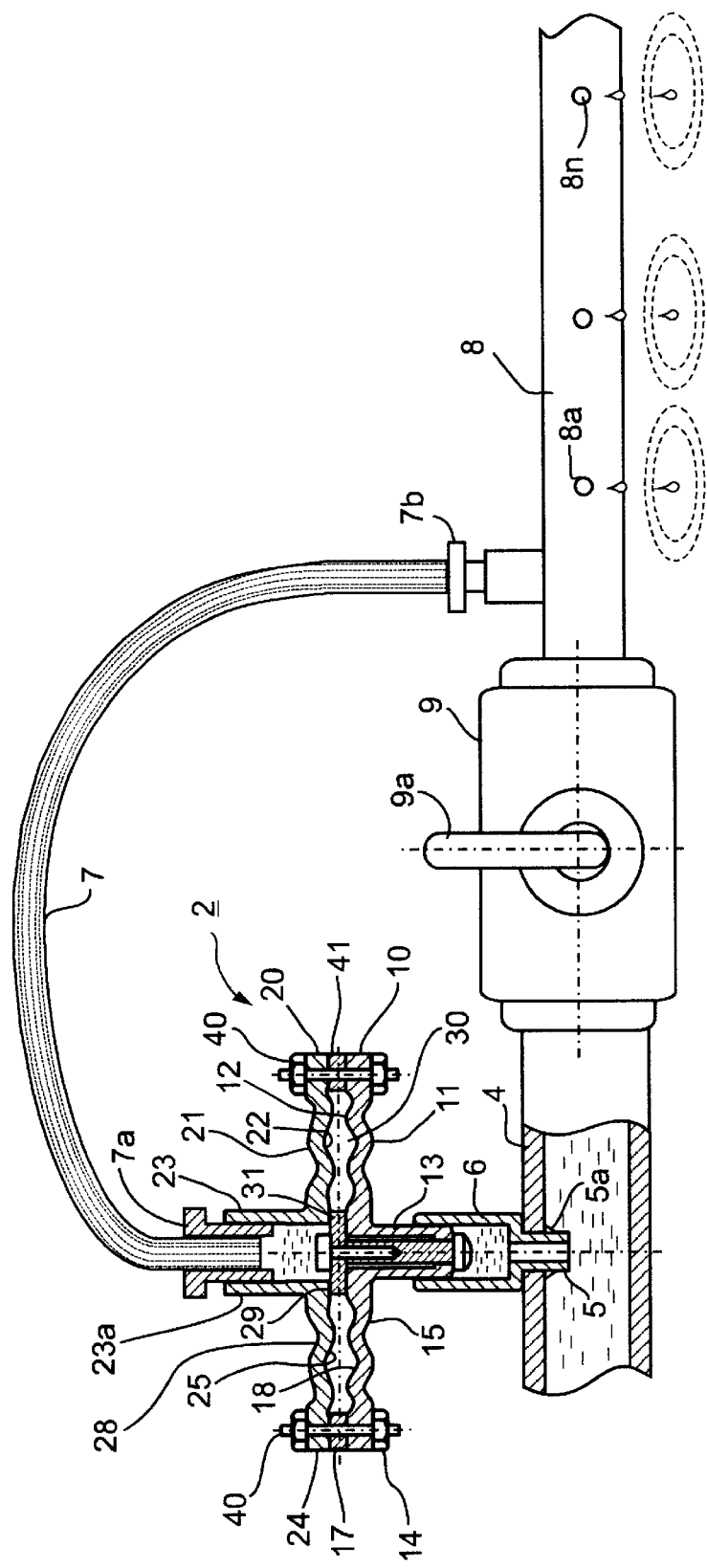
FIG. 2 illustrates the system of FIG. 1 but showing the control valve in its closed condition, thereby enabling the pulsator device to substantially decrease the water discharge rates from the emitter openings and to produce substantially smaller water drops at the emitter outlets.

The pulsator device is generally designated 2 in FIGS. 1 and 2. It is connected to a water supply conduit 4 by a tap 5 having a connector 6 insertable through the wall of the water supply conduit. Whereas in the above-cited patent the output of the pulsator device 2 is connected to a water sprinkler or the like, FIGS. 1 and 2 illustrate the output of the pulsator device 2 being connected by a small-diameter tube 7 to a dripper tube 8 provided with a plurality of emitter outlet openings 8a–8n, along the length of the tube. For example, a typical dripper tube 8 may include 50 or 100 emitter outlets 8a–8n.

The drip irrigation system illustrated in FIGS. 1 and 2 further includes a control valve 9 connecting the water supply conduit 4 to the dripper tube 8. Control valve 9 includes an operator 9a which may be manually moved either to an open position, as shown in FIG. 1, or to a closed position, as shown in FIG. 2. The pulsator device 2 connects the water supply conduit 4 from a point upstream of the control valve 9 to the dripper tube 8 at a point downstream of the control valve.

Thus, when the control valve is in the open position as shown in FIG. 1, the water flows directly from the water supply conduit 4 to the dripper tube 8, thereby by-passing the pulsator device 2, so that the dripper tube 8 receives a direct flow of the water from the water supply conduit 4 as in a conventional system. In such an arrangement, with the control valve 9 in its open condition, the water discharged from the emitter openings 8a–8n will be as in existing systems, shown as relatively large drops in FIG. 1, when compared to a system operating in accordance with the present invention as shown in FIG. 2.

FIG. 2 illustrates the system wherein the control valve is in its closed position, thereby connecting the water supply conduit 4 through the pulsator device to the dripper tube 8. As will be described more particularly below particularly with respect to FIGS. 7a–7f, this closed condition of the control valve enables the flow rate of the water supplied to the dripper tube to be substantially decreased, to a small fraction (e.g., of about one-fifth or even one-tenth) of the flow rate in the conventional system, to produce a substantially lower discharge rate from the emitter openings 8a–8n (indicated by the small drops in FIG. 2), than heretofore possible in existing systems, while at the same time enabling all the emitter openings to be operative to discharge the water at such low flow rates.

As more particularly described in my prior U.S. Pat. No. 6,026,851, pulsator device 2 includes a housing constituted of two circular end plates or discs 10, 20, which are attached together and sealed around their other peripheries such that they constitute a housing defining a fluid chamber 30. Thus, end plate 10 includes an outer face 11, an inner face 12, and a central connector sleeve 13 defining an inlet opening 13a (FIG. 4) for conducting the water into chamber 30; whereas circular end plate 20 includes an outer face 21, an inner face 22, and a central connector sleeve 23 defining the outlet opening 23a for discharging the water from chamber 30.

Figure 3:
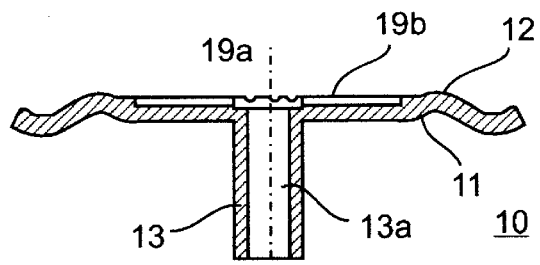
FIG. 3 is an enlarged sectional view illustrating the inlet housing wall in the pulsator device of FIGS. 1 and 2.

The outer face 11 of plate 10 is formed with a flat outer margin 14 (FIG. 3) and a plurality of concentric recesses 15 decreasing in diameter inwardly from margin 14 towards the central sleeve 13. The inner face 12 of end plate 10 is similarly formed with a flat outer margin 17 (FIG. 4) and with concentric circular recesses 18, which are aligned with the spaces between the concentric circular recesses 15 formed on the outer face 11.

Figure 4:
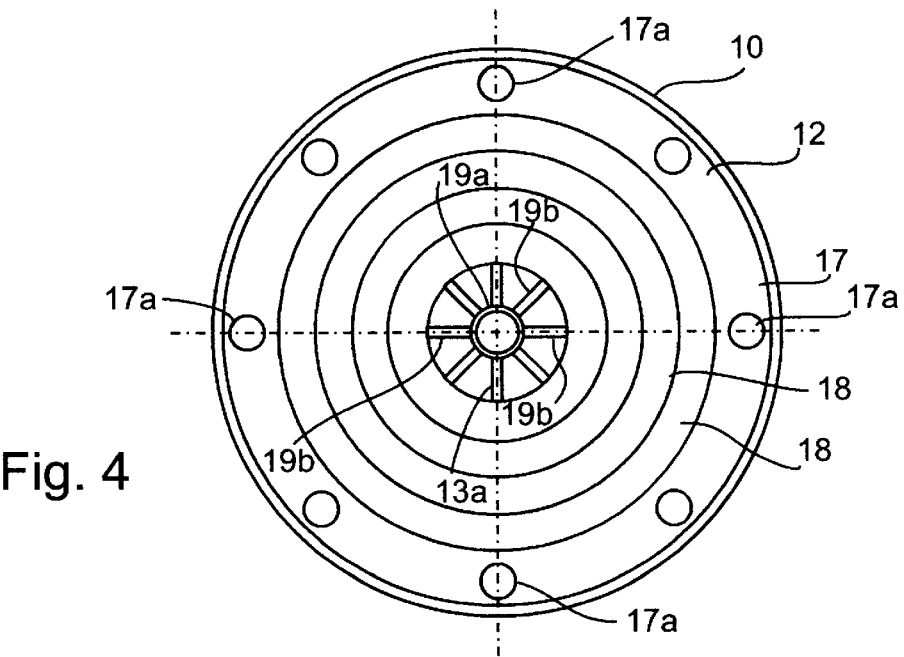
FIG. 4 is a top plan view illustrating the inner surface of the inner housing wall of FIG. 3.

The inner face 12 of end plate 10 is more particularly illustrated in FIG. 4. Thus, its flat outer margin 17 is formed with a plurality of openings 17a for receiving the fasteners fastening it to plate 20, as will be described more particularly below. It further includes a central circular recess 19a around the inlet opening 13a defined by the connector sleeve 13, and a plurality of radially-extending recesses 19b radiating outwardly from the circular recess 19a.

End plate 20 is of similar construction. It includes a flat peripheral margin 24 and a plurality of concetric circular recesses 25, 28 on its inner and outer faces, respectively. In end plate 20, however, the central region 29 circumscribing outlet opening 23a of the outlet sleeve 23 is flat and is not formed with recesses corresponding to circular recesses 19a and radial recesses 19b in end plate 10.

It will thus be seen that end plate 20, constitutes a wall formed with the outlet opening 23a, is displaceable away from end plate 10, constituting a wall formed with inlet opening 13a, upon an increase in the pressure of the water within chamber 30.

Figure 5:
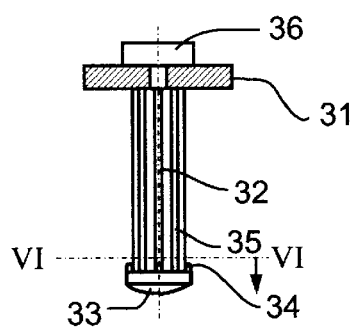
FIG. 5 is a side elevational view illustrating the stem and deformable membrane in the pulsator of FIGS. 1 and 2.
Figure 6:
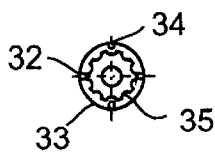
FIG. 6 is a sectional view along line VI—VI of FIG. 5.

The flat inner surface 29 of end plate 20 serves as a valve seat in cooperation with a deformable membrane 31 located within chamber 30 for controlling the flow of the water from that chamber via the outlet opening 23a. As shown particularly in FIG. 5, deformable membrane 31 is carried at the inner end of a stem 32 passing through the inlet opening 13a. Stem 32 is formed with enlarged head 33 (FIG. 6) having a plurality of spaced projections 34 on its inner surface engageable with the end of connector sleeve 13 so as to provide a flow passageway from socket 6 into the space between stem 32 and connector sleeve 13. Stem 32 is further formed with a plurality of axially-extending recesses 35 to conduct the water to the circular recess 19a on the inner face of end plate 10, and via the radial recesses 19b underlying the inner face of deformable membrane 31 into chamber 30.

Deformable membrane 31 is secured to the inner end of stem 32 by a fastener 36 passing through the center of the membrane. Thus, the center of membrane 31 is fixed to stem 32, but the outer periphery of the membrane is free to deform according to the differential pressure applied to the opposite faces of the membrane, as will be described more particularly below.

The two end plates 10, 20 are secured together by plurality of fasteners 40 passing through the flat outer peripheries 14, 24 of the two plates. A sealing ring 41 is interposed between the two plates to seal the chamber 30 defined by them. Although the two end plates 10, 20 are each made of substantially rigid plastic material, the concentric-recesses formed in their inner and outer faces permit their center regions to be displaced outwardly, and thereby to expand chamber 30 as the pressure within the chamber increases.

The axial recesses 35 in stem 32, and the recesses 19a, 19b in the inner face of end plate 10 covered by deformable membrane 31, define a reduced-flow passageway from the water supply pipe 4 into chamber 30 permitting a relatively low rate of water flow via the inlet opening 13a into the chamber. This low inflow rate is substantially lower than the outflow rate permitted through the outlet opening 23a when deformable membrane opens the outlet opening, as will be described more particularly below.

Pulsator 2 is connected to the dripper tube 8 via connector tube 7 which includes a connector 7a connected to the output end of the pulsator, and a connector 7b connected to the upstream end of the dripper tube The system operates as follows:

Initially, before the dripper tube 8 has been filled with water, control valve 9 is moved to its open position shown in FIG. 1. The water thus flows directly from the water supply conduit 4 into the dripper tube 8, so that the pulsator device 2 is ineffective at this stage. As soon as the dripper tube 8 has been filled with water, which would be indicated by drops being discharged from the outlet openings 8a as shown in FIG. 1, operator 9a of the control valve 9 may be moved to its closed position shown in FIG. 2, which thereby blocks the flow of the water from the water supply conduit 4 directly into the dripper tube 8. This makes the pulsator 2 effective to feed the water from the water supply conduit 4 in a pulsatile manner and at a slow rate, as shown in FIGS. 7a–7f, via the connecting tube 7 to the dripper tube 8.

FIGS. 7a–7f illustrate the connector 7b at the end of the connecting tube 7 disconnected from the dripper tube 8 in order to show the flow through that connector into the dripper tube, but it will be appreciated that it is shown in this manner purely for purposes of explanation, and that connector 7b would normally be connected to the dripper tube 8 as shown in FIGS. 1 and 2.

Figure 7A:
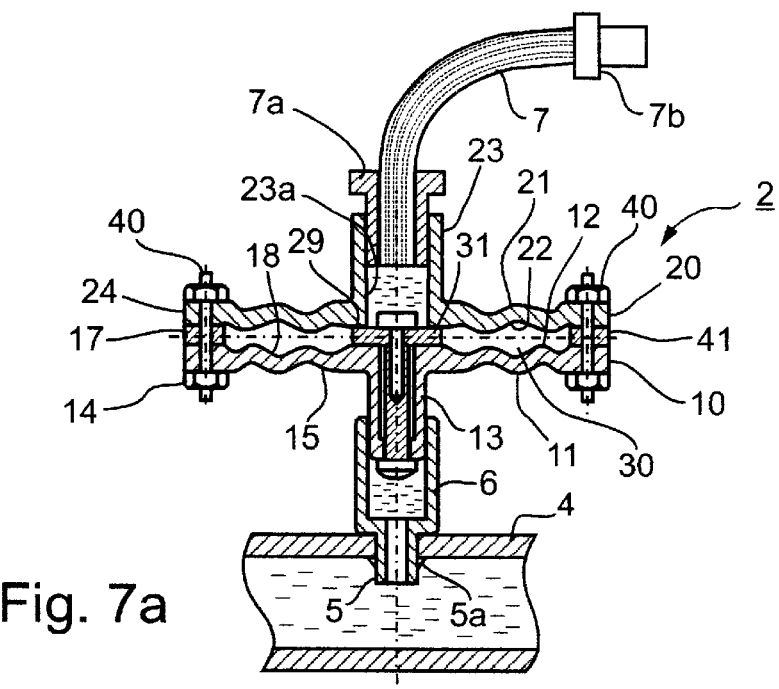
FIGS. 7a–7f illustrates six stages in the operation of the drip irrigation system of FIGS. 1 and 2.

Thus, FIG. 7a illustrates the initial condition of the system immediately after the control valve 9 has been moved to its closed condition as illustrated in FIG. 2, wherein it will be seen that the membrane 31 is seated against the outlet opening 23a so that no flow is produced through the connecting tube 7.

Water flows into the chamber 30, causing it to expand. Since the outer face of membrane 31 is vented to the atmosphere via the outlet opening 23a, the build-up of pressure within chamber 30 firmly presses the outer periphery of the membrane against the inner surface 29 of plate 20, thereby maintaining the outlet opening closed but causing the membrane to deform to the concave configuration illustrated in FIG. 7b.

Figure 7B:
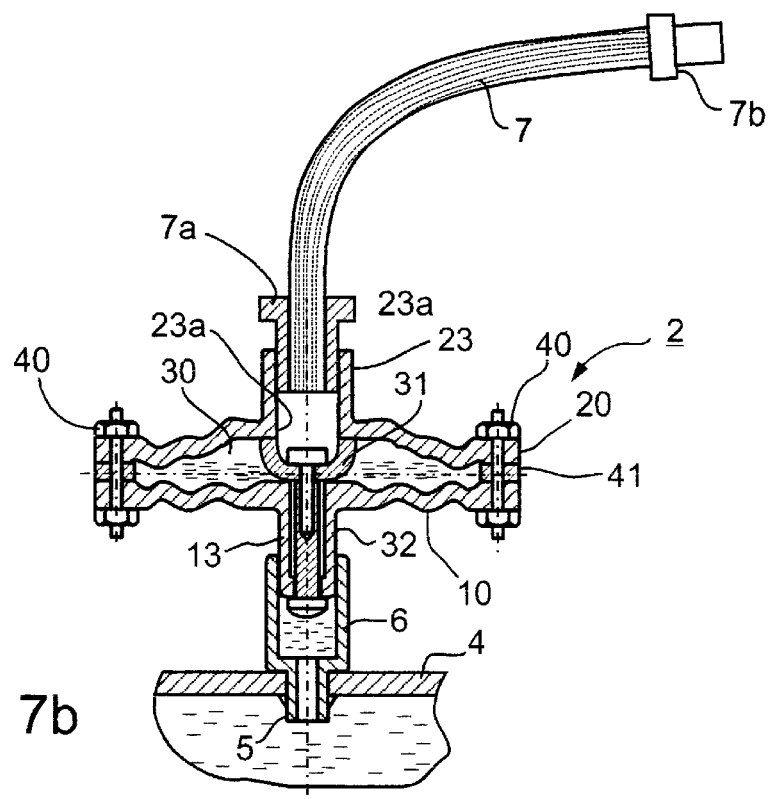
Figure 7C:
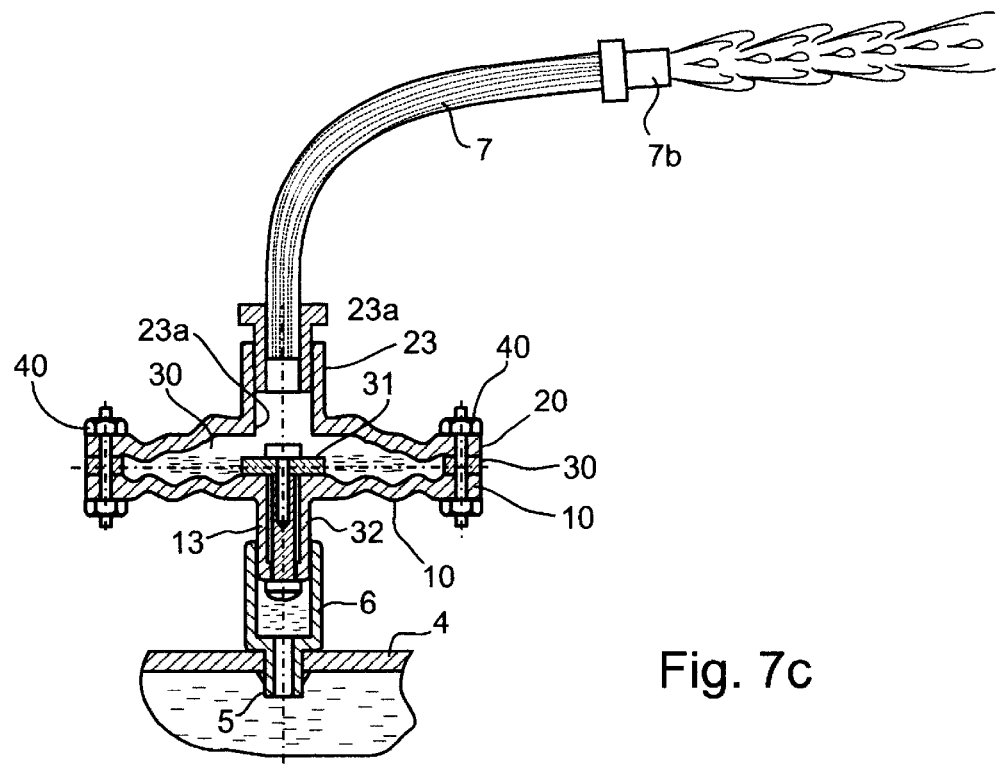
Figure 7D:
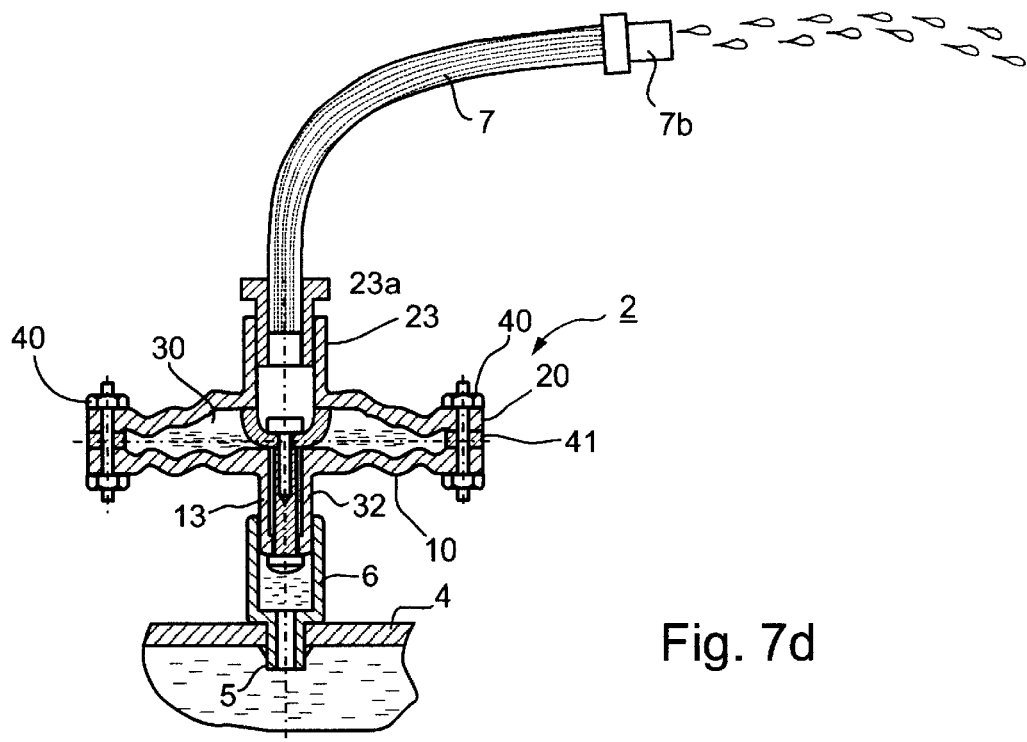
Figure 7E:
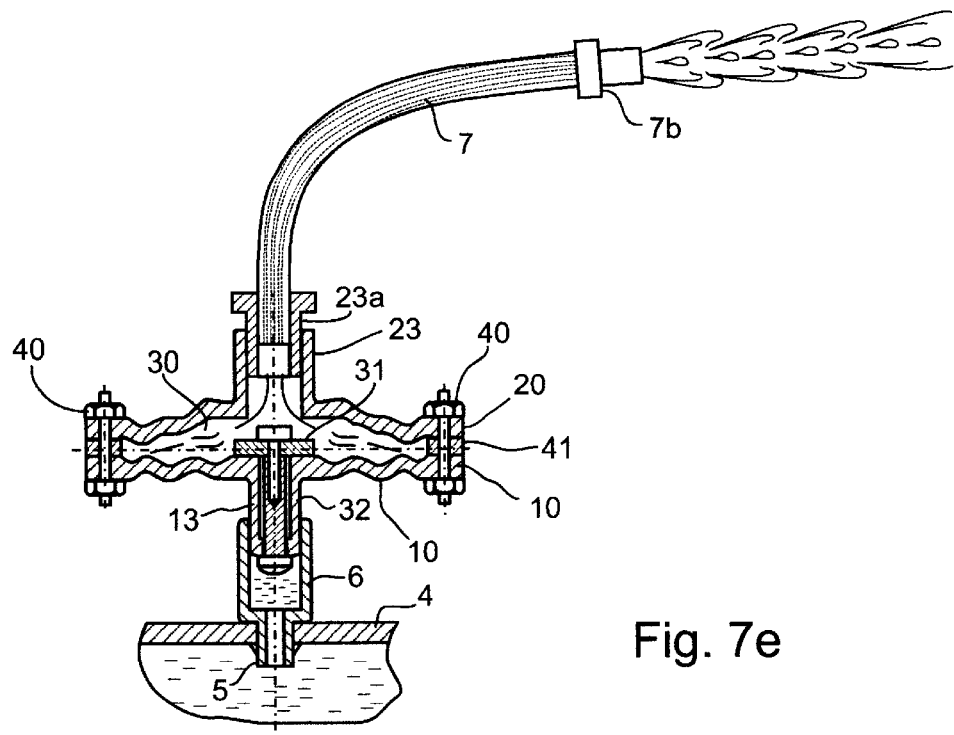
Figure 7F:
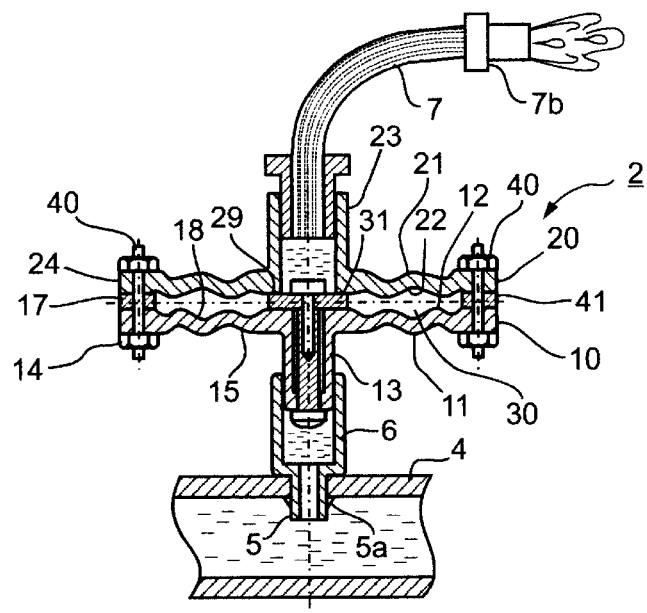

As the pressure within chamber 30 builds up, outlet opening 23a of plate 20 is displaced further until its displacement exceeds the deformability of the membrane 31, whereupon the outer periphery of the membrane separates from the inner surface of plate 20 to open the outlet opening. This produces a rapid discharge of a small quantity of the water from chamber 30, as shown in FIG. 7c, which thereby also releases the pressure within chamber 30 to enable plate 20 to quickly return to its normal unstressed condition to reclose the valve to the condition shown in FIG. 7a, whereupon the operations in FIGS. 7b and 7c are repeated, as shown in FIGS. 7d and 7e, respectively. While membrane 31 then recloses the outlet opening, there is still a small quantity of water within the connecting tube 7, which tends to flow out as shown in FIG. 7f.

The cycle is then repeated, thereby producing a pulsatile flow of the water from the water supply conduit 4 to the dripper tube 8 via the connecting tube 7.

It will be appreciated that the control valve 9 need not be completely closed, but could be partially closed for controlling the discharge rate of the water from the outlet openings of the dripper tube. For example, if very slow rates are desired, the control valve would be completely closed, but if larger flow rates are desired, the control valve could be partially opened so that the dripper tube 8 also receives some water directly from the water supply conduit 4.

It has been found that when the connecting tube 7 has an inner diameter of between 2 and 4 mm, preferably 2.5–3.0 mm with an outer diameter of 4 mm, and has a length of at least 5 cm, preferably 10–20 cm, and is made of substantially non-compressible polyethylene, the pulsations produced by the pulsator device through the connecting tube 7 are of a very high frequency. For example, whereas the conventional pulsators, e.g., as described in my above-cited U.S. Pat. No. 6,026,851, involve a pulsation frequency of less than one cycle per second (CPS), the construction described above in accordance with the present invention produces a pulsation frequency of at least one order of magnitude larger than that, e.g., probably well over 10 CPS, and probably more than 30 or 40 CPS. Actually, it was found that the connecting tube 7 appears to enter into a mechanical resonance or produce a feedback resonance, of even a much higher frequency with the pulsator device 2, since a high frequency sound or hum is heard, and a high frequency vibration is felt, during this operation of the pulsator device.

It also appears that the flow through the connecting tube 7 is not merely an interrupted, unidirectional flow, but rather that this flow also has bi-directional components. That is, when the outer end 7 of the connecting tube is disconnected from the dripper tube 8, and one's finger is placed over the outer end (across its outlet connector 7b), a suction force is felt. This bi-directional flow component, if present, is probably due to the fact that the membrane 31, when deformed to the condition illustrated in FIGS. 7b and 7d, assumes a concave configuration, thereby producing a slight suction force on the water within the connecting tube.

In any event, it was found that this operation of the pulsator device 2 enabled the flow rate of the water from the water supply conduit 4 to the dripper tube 8 to be substantially reduced to a fraction of what normally would be required in order to maintain reasonably good discharge from all the emitter outlets 8a–8n along the complete length of the dripper tube. Thus, it was found that the water supply rate could be reduced to the order of about one fifth or even one tenth, as low as 0.2 liters per hour for each emitter opening, as compared to the one or two liters per hour previously considered the minimum discharge rate in order to maintain satisfactory flow through all the emitter openings.

It will be appreciated that such a substantial reduction in the water supply rate enables a very substantial savings in water for irrigating the crops. It has also been found that, in some cases, the crop yields even increased together with the substantial savings in the water.

FIG. 8 illustrates the invention implemented in a control unit, generally designated 100, for use in an existing drip irrigation system using an existing water supply conduit 104 for feeding a conventional dripper tube 108. In the control unit illustrated in FIG. 8, the pulsator device is generally designated 102 and the connecting tube is generally designated 107.

In the construction illustrated in FIG. 8, the control valve, generally designated 109, includes a housing 110 formed with an inlet end 111 for connection to the water supply conduit 104, and an outlet end 112 for connection to the dripper tube 108. Valve housing 110 further includes a coupling 113 at the upstream side of its valve member 109b for connection to the inlet end of the pulsator device 102, and a second coupling 114 at the downstream side of the valve member 109b for coupling to connector 107b of the connecting tube 107.

In all other respects, the control unit illustrated in FIG. 8 is constructed and operates in substantially the same manner as described above with respect to FIGS. 1 and 2.

Figure 9:
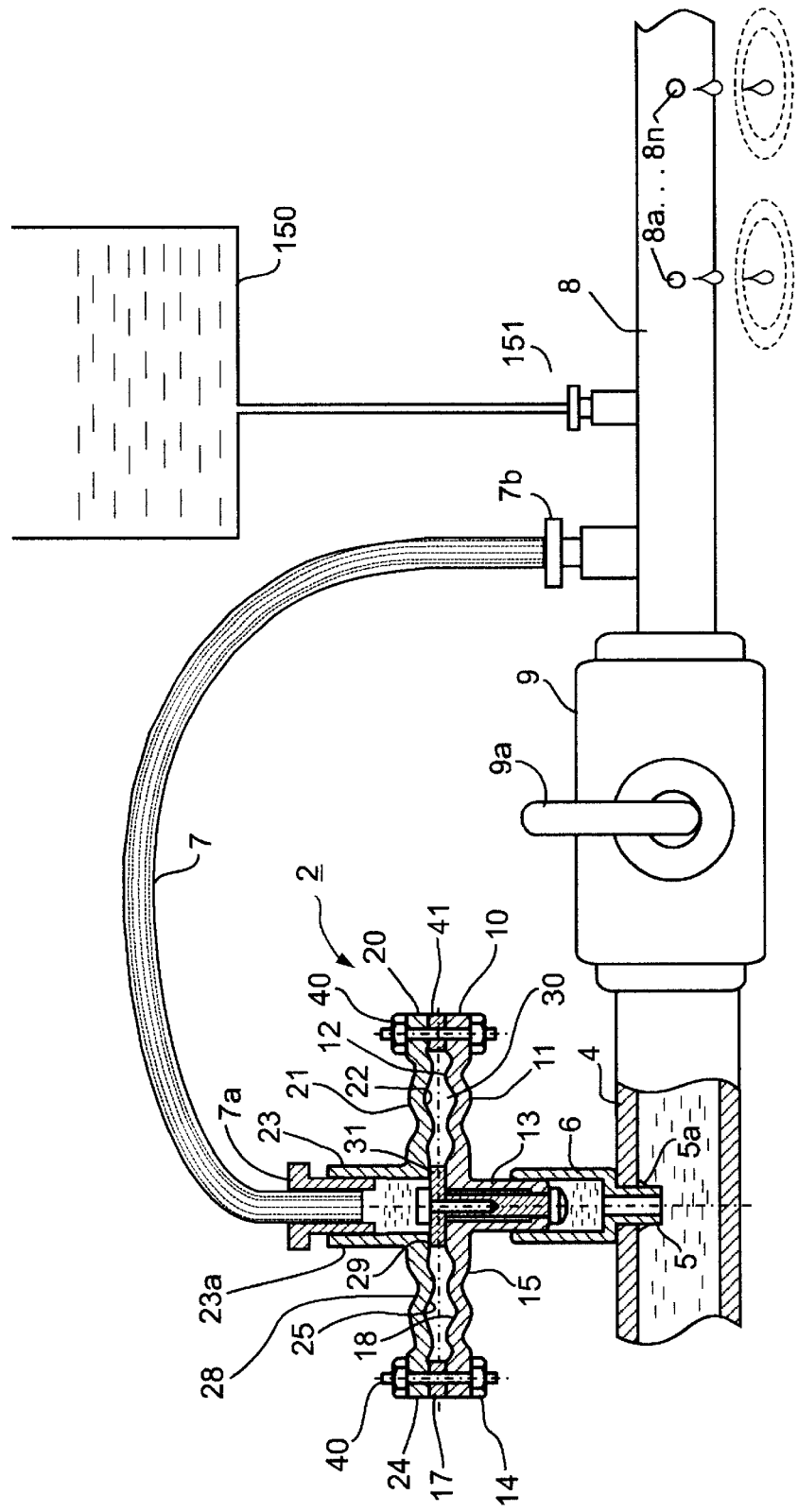
FIG. 9 illustrates a drip irrigation system similar to that of FIG. 1 but showing how the system also enables water from other sources, such as water collection from refrigeration systems, etc., to be used in the drip irrigation system.

FIG. 9 illustrates a system similar to that of FIG. 1, and therefore the same parts are correspondingly numbered to facilitate understanding. The system illustrated in FIG. 9, however, includes an additional source of water, such as a reservoir 150, coupled to an inlet 151 in the dripper tube 8 just downstream of the control valve 9. The reservoir 150 may contain, for example, waste water from other sources, such as from air conditioning systems, rain collections, etc., which water is effectively pumped by the pulsator device 2 through the dripper tube 8, the pulsator device using the pressurized water of the water supply conduit 4.

Figure 10:
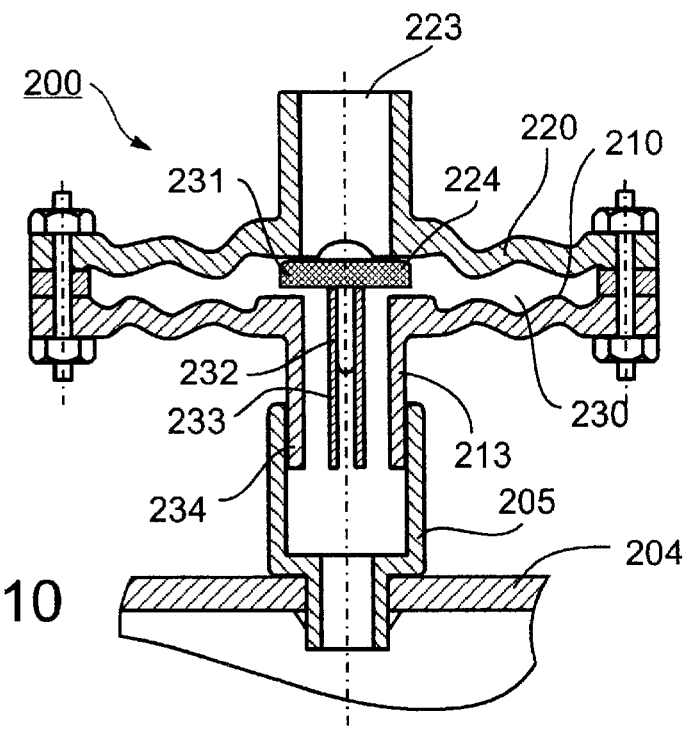
FIG. 10 is a sectional view, similar to that of FIG. 7a, illustrating the construction of another pulsator device which may be used particularly with respect to longer dripper tubes having larger numbers of emitters along their lengths.
Figure 11:
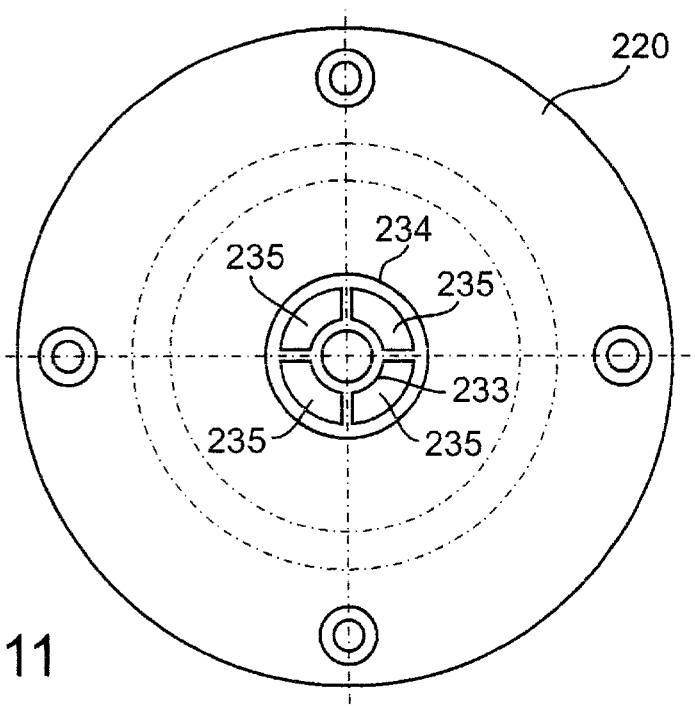
FIG. 11 is a bottom view of the pulsator device of FIG. 10.

FIGS. 10 and 11 illustrate another pulsator device, generally designated 200, which may be used for supplying a pulsatile water flow from a water supply pipe 204, via its connector 205, to a dripper tube (not shown) having larger numbers of emitter elements along its length. For this purpose, the pulsator device shown in FIGS. 10 and 11 has a larger inlet than the pulsator device described above, to accommodate the larger water rate required in such longer dripper tubes. In addition, the pulsator device illustrated in FIGS. 10 and 11 is slightly modified in construction to produce the pulsatile water flow of even higher frequency than the pulsator device described earlier.

Thus, the pulsator device illustrated in FIGS. 10 and 11, and therein generally designated 200, includes a housing constituted of two circular discs 210, 220, each constructed and attached to the other as described above with respect to FIG. 1 to define a fluid chamber 230. Disposed within chamber 230 is a membrane 231 carried at the inner end of a stem 232 for controlling the flow of the water from an inlet connector sleeve 213 to an outer connector sleeve 223 via an outlet opening 224.

In this case, the stem 232 of the membrane 231 is press-fitted into the end of an inner connector sleeve 233 circumscribed by an outer connector sleeve 254 defining a plurality of axially-extending channels 235 (FIG. 11) between the two sleeves. Channels 235 serve as a large-flow passageway of water from connector 205 of the water supply conduit 204 into chamber 230.

Chamber 230 is expansible-contractible in the same manner as described above with respect to chamber 30 in FIG. 1. However, membrane 231 is stiffer, i.e., less deformable, than membrane 31 in FIG. 1. For example, membrane 231 may be made of rubber of higher density than membrane 31 so as to be stiffer and less deformable.

Pulsator 200 illustrated in FIGS. 10 and 11 operates substantially in the same manner as described above with respect to FIGS. 7a–7f, except that, since membrane 231 is stiffer than membrane 31 in FIGS. 7a–7f, the membrane can open and close the outlet opening at a higher frequency than membrane 31 described above with respect to FIGS. 7a–7f. This produces a pulsatile water flow of higher frequency, particularly when the movements of the membrane are involved in a resonant feedback system as described above.

Another difference in the pulsator illustrated in FIGS. 10 and 11 over that described earlier is that the larger inlet openings defined by the plurality of channels 235 between the inner and outer connector sleeves 233, 234 enables the pulsator to receive the inletted water from the water supply conduit 204 at higher rates, and thereby to supply dripper tubes of longer length or of larger numbers of emitters.

Figure 12:
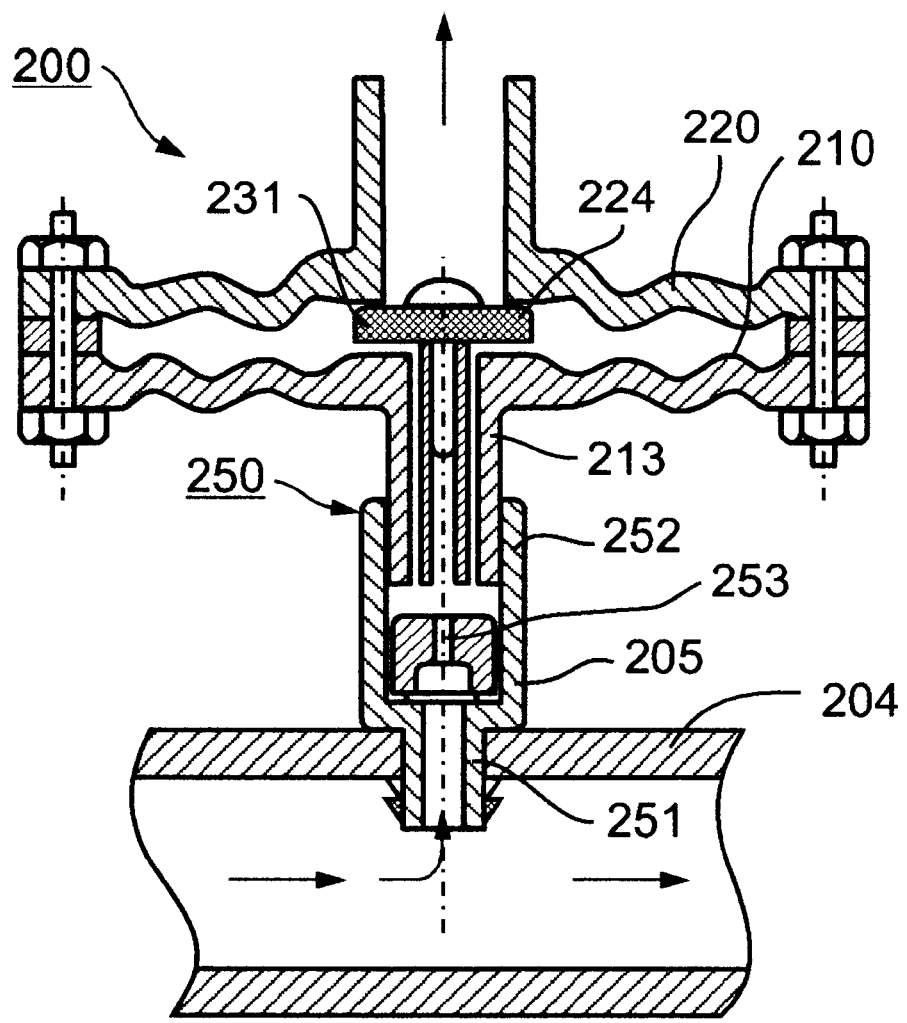
FIG. 12 illustrates the use of an adapter with the pulsator device of FIGS. 10 and 11 for adapting the device for dripper tubes requiring lower rates of water supply.

FIG. 12 illustrates the manner in which a pulsator, such as pulsator 200 described above with respect to FIGS. 10 and 11, can be used to supply shorter dripper tubes or dripper tubes having a smaller number of emitters. Thus, when a pulsator device 200 is to be used in such an application, an adapter, shown at 250 in FIG. 12, may be used, having one end 251 inserted into the outlet connector 205 of the water supply conduit 204, and an opposite end 252 receiving the inlet connector 213 of the pulsator 200. Adapter 250 is formed with a restrictor passageway 253 of the appropriate cross-sectional area according to the discharge rate desired to be produced by the pulsator. It will be appreciated that a number of such adapters 250 could be provided, each having a restrictor passageway 253 of different cross-sectional area, according to the discharge rate desired for any particular application.

While the invention has been described with respect to several preferred embodiments, it will be appreciated that these are set forth merely for purposes of example, and that many other variations, modifications and applications of the invention may be made. For example, while particularly good results are obtainable by using the pulsator device described herein, other pulsator devices may be used, for example, those described in U.S. Pat. Nos. 4,781,217; 4,955,539 and 5,507,436.

Many other variations, modifications and applications of the invention will be apparent.

What is claimed is:

1. A water irrigation system, comprising:
   a water supply conduit;
   a dripper tube having a plurality of water discharge openings along its length for discharging water at a slow rate from each opening;
   and a pulsator device connecting the said water supply conduit to said dripper tube by a connecting tube of a length and cross-sectional area such as to produce a resonant feedback system with the pulsator device producing a pulsatile water flow to the dripper tube having a frequency exceeding 10 CPS.

2. A water irrigation system, comprising:
   a water supply conduit;
   a dripper tube provided with a plurality of emitter openings along its length for discharging water at a slow rate from each emitter opening;
   a control valve connecting said water supply conduit to said dripper tube;
   and a pulsator device connecting said water supply conduit from a point upstream of said control valve to said dripper tube at a point downstream of said control valve;
   said control valve having an open position to produce a continuous water flow from the water supply conduit to the dripper tube to fill the dripper tube;
   and a closed position to produce a pulsatile water flow from the water supply conduit to said dripper tube via said pulsator device.

3. The water irrigation system according to claim 2, wherein said pulsator device connects said water supply conduit to said dripper tube via a connecting tube having a length and cross-sectional area such as to produce a resonant feedback system with said pulsator device producing a pulsatile water flow to the dripper tube having a frequency exceeding 10 CPS.

4. The water irrigation system according to claim 3, wherein said connecting tube has an inner diameter of 2–4 mm, and a length greater than 5 cm.

5. The water irrigation system according to claim 3, wherein said connecting tube has an inner diameter of 2.5–3.0 mm, and a length of 10–20 cm.

6. The water irrigation system according to claim 5, wherein the pulsator device and the connecting tube produce a pulsatile water flow of a frequency of at least 30–40 CPS.

7. The water irrigation system according to claim 2, wherein an additional water supply is coupled to an inlet to said dripper tube just downstream of said control valve, thereby permitting pressurized water in said water supply conduit to actuate said pulsatile device to act as a pump for pumping the water inletted to said dripper tube from said additional water supply.

8. The water irrigation system according to claim 1, wherein said pulsator device includes:
   a housing defining an expansible-contractible water chamber having an inlet opening and an outlet opening;
   and a membrane within said chamber such that in the contracted condition of the chamber, the membrane closes said outlet opening, and upon the expansion of said chamber, said membrane tends to open said outlet opening to produce a pulsatile water flow to said dripper tube.

9. The water irrigation system according to Claim 8, wherein said housing is of a bellows construction defining said expansible-contractible chamber.

10. The water irrigation system according to claim 8, wherein said membrane of the pulsator device is carried by a stem movable through an inlet sleeve connecting the inlet of the pulsator device to the water supply conduit; said stem being formed with an enlarged head having a plurality of spaced projections engageable with said inlet sleeve, and being further formed with a plurality of axially-extending recesses, defining a low flow passageway of water from said water supply conduit into said expansible-contractible chamber.

11. The water irrigation system according to claim 8, wherein said membrane of the pulsator device is carried by a stem movable through an inlet sleeve connecting the inlet of the pulsator device to the water supply conduit; said inlet sleeve including an axially-extending channel to define a large-flow passageway of water from the water supply conduit into said expansible-contractible chamber.

12. The water irrigation system according to claim 2, wherein said control valve and pulsator device are constructed as a control unit having a first connector at one end for connection to the water supply conduit, and a second connector at the opposite end for connection to the dripper tube.

13. A control unit for use in a drip irrigation system having a water supply conduit and a dripper tube provided with a plurality of emitter openings along its length for discharging water at a slow rate from each emitter opening; said control unit comprising:

a housing having an inlet end connectable to said water supply conduit, and an outlet end connectable to said dripper tube;

a valve member within said housing movable from an open position for permitting water flow from said inlet to said outlet, and to a closed position for blocking water flow from said inlet to said outlet;

a pulsator device having an inlet connected to said housing between its inlet and said valve member;

and a connecting tube connected between the outlet of the pulsator device and the housing between its outlet and said valve member.

14. The water irrigation system according to claim 13, wherein said pulsator device connects said water supply conduit to said dripper tube via a connecting tube having a length and cross-sectional area such as to produce a resonant feedback system with said pulsator device producing a pulsatile water flow to the dripper tube having a frequency exceeding 10 CPS.

15. The control unit according to claim 14, wherein said connecting tube has an inner diameter of 2–4 mm, and a length greater than 5 cm.

16. The control unit according to claim 14, wherein said connecting tube has an inner diameter of 2.5–3.0 mm, and a length of 10–20 cm.

17. The control unit according to claim 14, wherein the pulsator device and the connecting tube produce pulsatile water flow of a frequency of at least 30–40 CPS.

18. The water irrigation system according to claim 14, wherein said pulsator device includes:

a housing defining an expansible-contractible water chamber having an inlet opening and an outlet opening;

and a membrane within said chamber such that in the contracted condition of the chamber, the membrane closes said outlet opening, and upon the expansion of said chamber, said membrane tends to open said outlet opening to produce a pulsatile water flow to said dripper tube.

19. The water irrigation system according to claim 18, wherein said housing is of a bellows construction defining said expansible-contractible chamber.

20. The water irrigation system according to claim 18, wherein said membrane of the pulsator device is carried by a stem movable through an inlet sleeve connecting the inlet of the pulsator device to the water supply conduit; said stem being formed with an enlarged head having a plurality of spaced projections engageable with said inlet sleeve, and being further formed with a plurality of axially-extending recesses, defining a low flow passageway of water from said water supply conduit into said expansible-contractible chamber.

21. The water irrigation system according to claim 18, wherein said membrane of the pulsator device is carried by a stem moveable through an inlet sleeve connecting the inlet of the pulsator device to the water supply conduit; said inlet sleeve including an axially-extending channel to define a large-flow passageway of water from the water supply conduit into said expansible-contractible chamber.

22. A method of irrigation, comprising:

supplying water from a water supply conduit to a dripper tube provided with a plurality of emitter openings along the length of the dripper tube;

and feeding the water from the water supply conduit to the dripper tube via a a connecting tube of a length and cross-sectional area such as to produce a resonant feedback system with the pulsator device producing a pulsatile water flow to the dripper tube having a frequency exceeding 10 CPS.

23. A method of irrigation, comprising:

supplying water from a water supply conduit to a dripper tube provided with a plurality of emitter openings along the length of the dripper tube;

initially feeding the water from the water supply conduit to the dripper tube at a high rate to at least partially fill the dripper tube with water and to start to produce discharges of water from said emitter openings at a relatively low rate from each emitter opening;

and thereafter feeding the water from the water supply conduit to the dripper tube at a low rate via a pulsator which produces a high-frequency pulsatile water flow within the dripper tube effectively moving the water along the length of the dripper tube to said emitter openings.

24. The method of irrigation according to claim 23, wherein said pulsator produces high frequency pulses of at least 10 pulses/second to the dripper tube.

25. The method of irrigation according to claim 23, wherein said pulsator device is connected to said dripper tube by a connecting tube of a length and cross-sectional area such as to produce a resonant feedback system with the pulsator device producing a pulsatile water flow to the dripper tube having a frequency exceeding 10 CPS.

26. The method of irrigation according to claim 23, wherein the water is supplied from the water supply conduit to the dripper tube via a control valve which has an open position to feed the water directly from the water supply conduit to the dripper tube, and a closed position to feed the water via said pulsator which produces said high frequency pulses of the water within the dripper tube.

27. The method of irrigation according to claim 23, wherein an additional water supply is coupled to an inlet to said dripper tube just downstream of said control valve, thereby permitting pressurized water in said water supply conduit to actuate said pulsatile device to act as a pump for pumping the water inletted to said dripper tube from said additional water supply.

* * * * *